(12) United States Patent  
Frazer et al.

(10) Patent No.: US 6,457,246 B1  
(45) Date of Patent: Oct. 1, 2002

(54) MOUNTING AND SWITCHING OF SURVEY APPARATUS

(75) Inventors: Ronald Keith Frazer, Subiaco (AU); Geoffrey Arnold, Mount Isa (AU); Ian David McKay, 26 Castle Road, Woodlands WA 6018 (AU)

(73) Assignees: Frazer-McKay Pty Ltd, Osborne Park (AU); Ian David McKay, Woodlands (AU)

( * ) Notice: Subject to any disclaimer, the term of this patent is extended or adjusted under 35 U.S.C. 154(b) by 0 days.

(21) Appl. No.: 09/601,396

(22) PCT Filed: Jan. 27, 1999

(86) PCT No.: PCT/AU99/00055  
§ 371 (c)(1),  
(2), (4) Date: May 1, 2001

(87) PCT Pub. No.: WO99/39079  
PCT Pub. Date: Aug. 5, 1999

(30) Foreign Application Priority Data

Jan. 29, 1998 (AU) .............................................. PP 1580

(51) Int. Cl.⁷ .......................... G01B 11/26; G01C 15/00
(52) U.S. Cl. ...................... 33/286; 33/1 H; 33/DIG. 21
(58) Field of Search ........................... 33/286, 1 H, 227, 33/228, 263, 290, DIG. 21

(56) References Cited

U.S. PATENT DOCUMENTS

| | | | | |
|---|---|---|---|---|
| 1,145,664 A | * | 7/1915 | Bower | 33/290 |
| 3,631,601 A | * | 1/1972 | McNulty | 33/228 |
| 4,446,626 A | | 5/1984 | Grender et al. | |
| 5,035,060 A | * | 7/1991 | Scott | 33/1 H |
| 5,446,535 A | * | 8/1995 | Williams | 33/286 |
| 5,568,265 A | | 10/1996 | Matthews | 33/286 |
| 5,575,073 A | | 11/1996 | von Wedemayer | |
| 5,584,458 A | | 12/1996 | Rando | |
| 5,709,609 A | | 1/1998 | Carney | |
| 5,738,595 A | | 4/1998 | Carney | 33/290 |
| 6,124,935 A | * | 9/2000 | Matthews | 33/286 |

FOREIGN PATENT DOCUMENTS

EP 0168 664 A2 1/1986

* cited by examiner

*Primary Examiner*—Christopher W. Fulton

(57) ABSTRACT

A survey apparatus which can be used in the underground mining industry comprises a mounting means (11) adapted to be mounted in a fixed surface (such as a tunnel wall) and an alignement means (130, 101) to releasably engage with the mounting means (11), wherein the alignement means (130, 101) is capable of operating only when the alignement means (130, 101) is engaged with the mounting means (11). The mounting means (11) is preferably a sleeve member (11) insertable in a wall. The alignement means (130, 101) preferably has a laser module (102) and a suitable compartment for accomodating a battery (151). The mounting means (11), which is a set aligned in the fixed surface, together with the factory-set alignement means (130, 101) is used for the purpose of setting out and alignments. When the cylindrical shaft (133) is inserted into the sleeve member (11), a rod (170), permanently in contact with spring (154) presses against the screw (158) and makes an electrical connection. As the laser module (102) cannot be switched on when out of the sleeve member (11), battery life is improved and improper use is minimized.

8 Claims, 8 Drawing Sheets

MOUNTING AND SWITCHING OF SURVEY APPARATUS

FIELD OF INVENTION

The present invention relates to a survey apparatus and a survey method. More particularly, the preferred embodiments of the present invention relate to a laser survey apparatus and a survey method using a laser survey apparatus for use in the underground mining industry.

BACKGROUND ART

Current methods for the survey control of azimuth and grade in an underground mine during excavation of a tunnel in the mine typically involve the use of survey stations installed in a manner whereby the bearing between the survey stations is generally set to correspond to the bearing of the heading required for excavation.

The survey stations are typically comprised of two eye bolts installed in the roof of the heading in the underground mine along the centre line of excavation of the heading. Two wires are usually strung from the eye bolts and have a weight tied to the bottom of each wire. A mine worker can subsequently sight through the wires and mark a centre line at the working face of the excavation.

Grade control is usually achieved through the installation of four eye bolts in the walls of the tunnel. These eye bolts are joined in pairs by wires and a mine worker is able to sight through these wires and mark an offset floor height at the working face of the excavation.

Unfortunately, the nature of underground mining and the constraints placed upon its workers lead to a variety of problems.

The eye bolts are easily damaged by machinery or the destructive effects of blasting. The wires also utilised in the survey stations are commonly broken as a result of not being wound up after use. Further, the ventilation in use in underground mines typically causes the installed wires to sway when hanging from the roof of the heading. This swaying movement results in inaccuracies when sighting. The very method of sighting introduces an unacceptable level of human error and requires operation by particularly skilled workers to be effective.

The requirement for the use of wires in current methods can result in a less skilled or an inattentive mine worker incorrectly determining the line and grade in an excavation.

Relatively recent developments include the utilisation of lasers for the alignment of development headings. Methods utilising lasers used to this point have been labour and time intensive, and can result in damage to the lasers. In addition, a front target has traditionally been required for accuracy confirmation and adjustment. At least in part because of these reasons, lasers have generally only been used to this point if a heading is going to be beyond a certain length, for example 100 metres.

Unfortunately, shorter headings do form the majority of such work. However, some recent work has been conducted utilising pen-sized lasers in headings less than 100 metres. However, the mounting of such a laser on the walls of a heading require brackets and bolting, taking a significant amount of time to set up or establish, are not received easily and are similarly not adjusted easily.

The temperamental nature of lasers and their mountings has required complicated checking systems to ensure that the laser has not moved from its original position.

Still more recent developments have included the mounting of a laser in a PVC tube of a size big enough to hold the entire laser within the PVC tube, in a pre-drilled aperture in a strata face. The pre-drilled aperture is partially filled with chemical grout and the PVC tube containing the laser is inserted into the aperture. The curing of the grout in this arrangement typically moves the pipe and laser from their original alignment. As such, recalculation of the target is generally required.

A further problem associated with this arrangement is the switching on/off of the laser. The mounting method utilised does not allow access to the laser when in position.

STATEMENT OF INVENTION

The present invention attempts to overcome one or more of the disadvantages of the prior art.

According to the present invention there is provided a survey apparatus comprising:
  a mounting means adapted to be mounted on a fixed object; and
  an alignment means adapted to releasably engage with the mounting means,
    wherein the alignment means is capable of operating when the alignment means is engaged with the mounting means.

Preferably, the alignment means is provided therein a switch means. The switch means is preferably actuated upon receival of the alignment means in the mounting means, thereby causing operation of the alignment means.

The alignment means may include a laser means and the alignment means may also include a battery means.

Still further, the alignment means is preferably provided with a mechanism to releasably lock the alignment means in position with respect to the mounting means.

The mounting means is preferably formed with a cone-shaped first end to facilitate penetration into an epoxy resin used to locate the mounting means within a fixed surface. An outer surface of the mounting means may be provided with a portion or portions thereof knurled and/or grooved to facilitate grip with the epoxy resin.

The mounting means further preferably comprises a biasing means that acts to bias the alignment means out of the mounting means.

The alignment means preferably supports the laser means in an adjustable manner, preferably by way of an array of adjustable screws, whereby selective adjustment of the screws being able to adjust alignment of the laser means.

According to the present invention there is preferably provided a method of survey control comprising the following steps:
  making an aperture in a fixed surface for receiving a mounting means;
  connecting an alignment means to the mounting means, wherein connecting of the alignment means to the mounting means operates the alignment means.

BRIEF DESCRIPTION OF DRAWINGS

Preferred embodiments of the present invention will be described below, by way of example only, with reference to the following drawings.

DESCRIPTION OF THE PREFERRED EMBODIMENTS

FIGS. 1 to 9 show a laser survey apparatus in accordance with the preferred embodiments o f the present invention.

Figure 1:
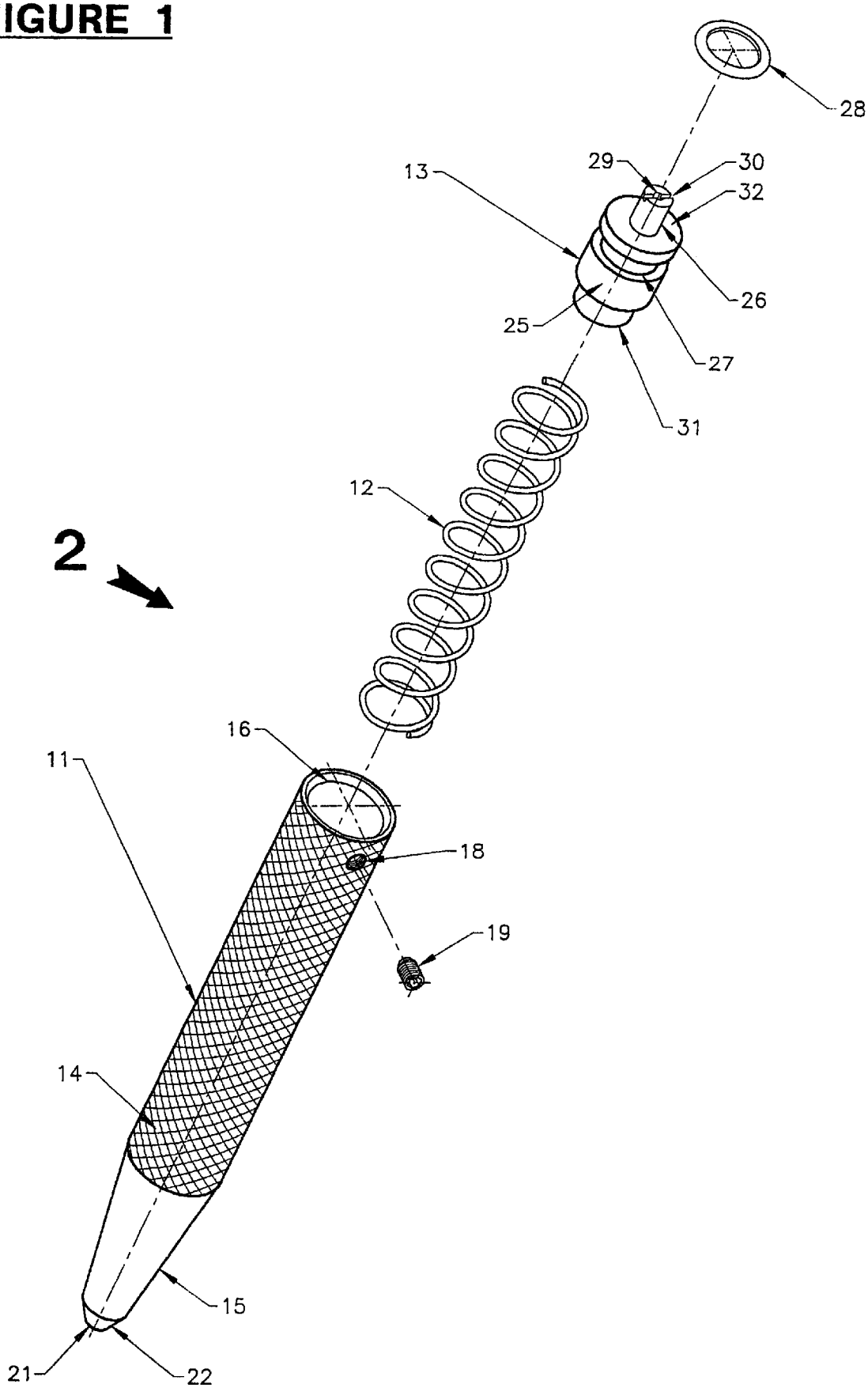
FIG. 1 is a perspective exploded view of a preferred embodiment of a sleeve assembly in accordance with the present invention.
Figure 6:
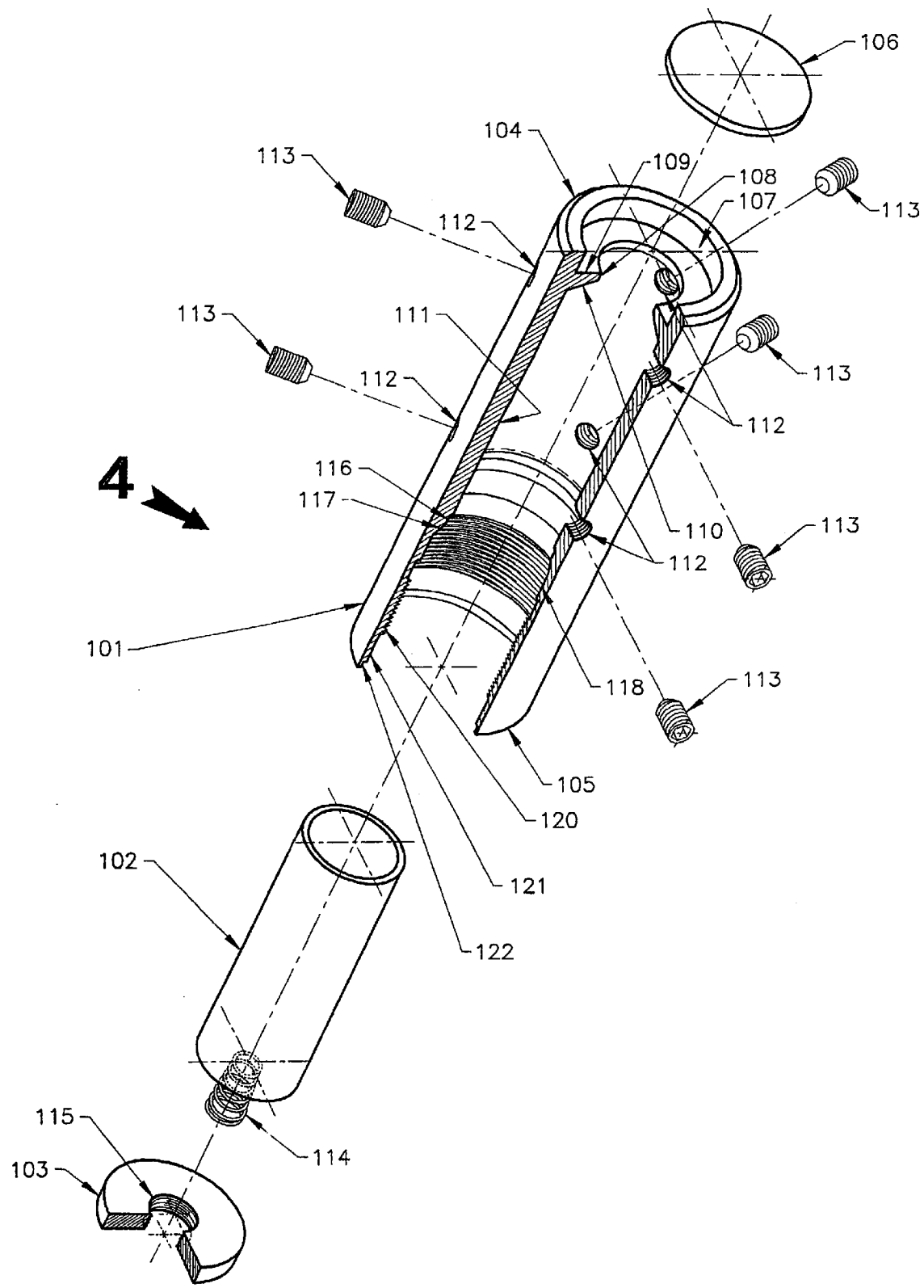
FIG. 6 shows a perspective exploded view of a preferred embodiment of the laser housing in accordance with the present invention.
Figure 7:
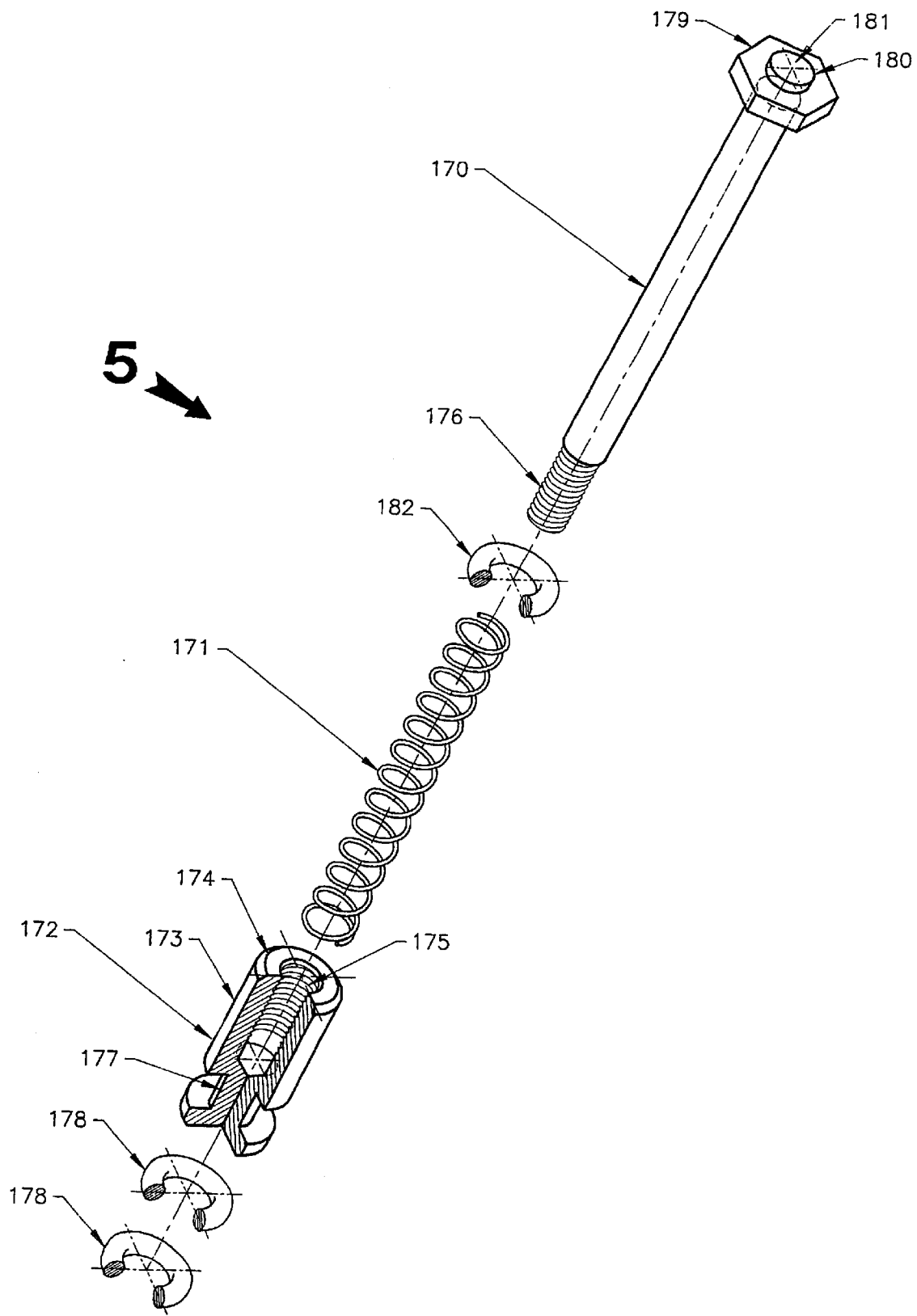
FIG. 7 shows a perspective exploded view of a preferred embodiment of switch assembly in accordance with the present invention.
Figures 8, 9:
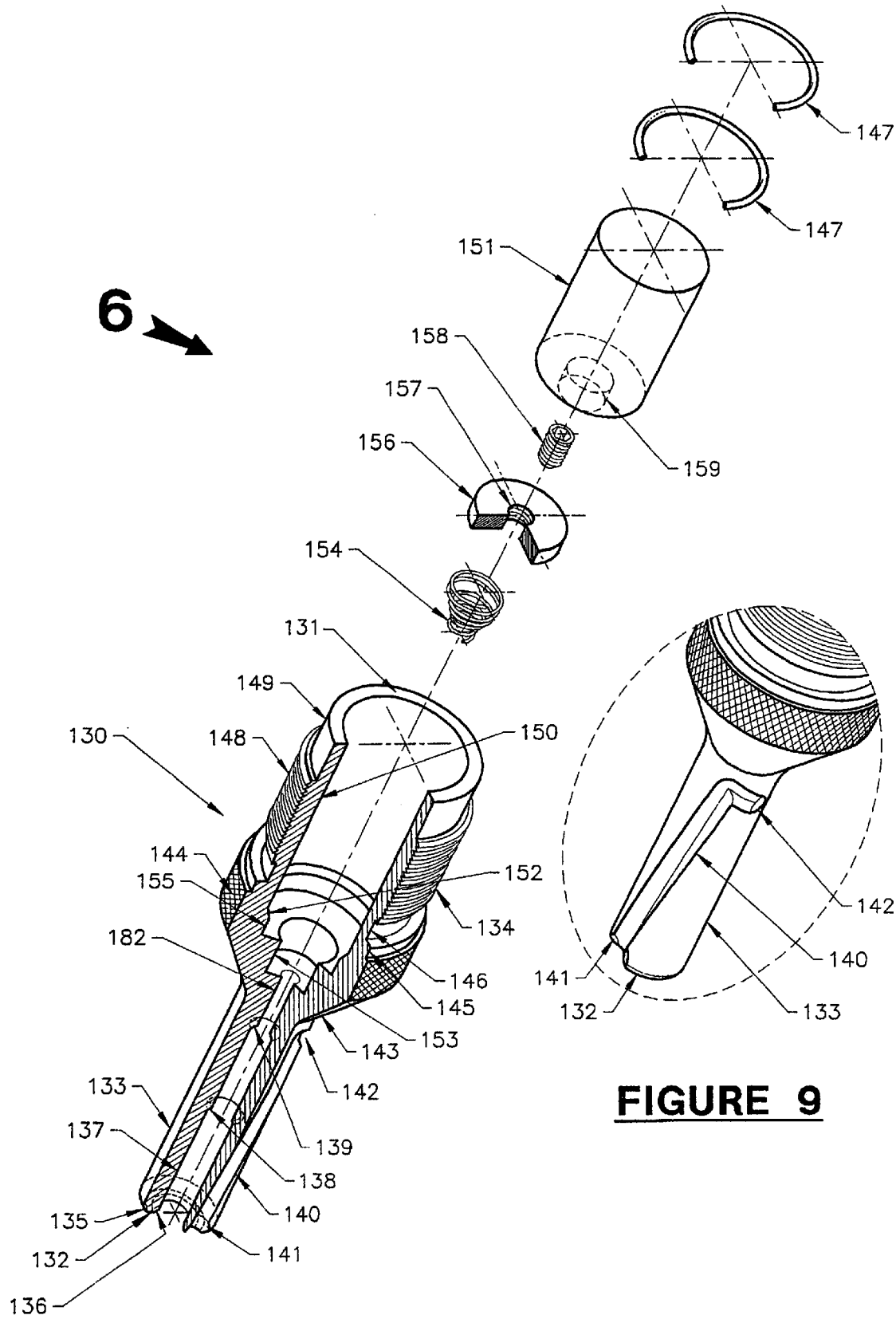
FIG. 8 illustrates a perspective exploded view of a preferred embodiment of a switch housing assembly in accordance with the present invention.
FIG. 9 shows details of part of the switch housing assembly of FIG. 8.

The laser apparatus 1 of the preferred embodiment of the present invention is generally comprised mounting means and an alignment means. The mounting means preferably comprises a sleeve assembly 2 as illustrated in FIG. 1. The alignment means preferably comprises a laser housing assembly 4, as shown in FIG. 6, and a switch means. The switch means preferably comprises a switch actuating assembly 5, as shown in FIG. 7, and a switch housing assembly 6, as shown in FIG. 8. A plug assembly 3 may also be provided as a closure for the sleeve assembly 2.

Figure 10:
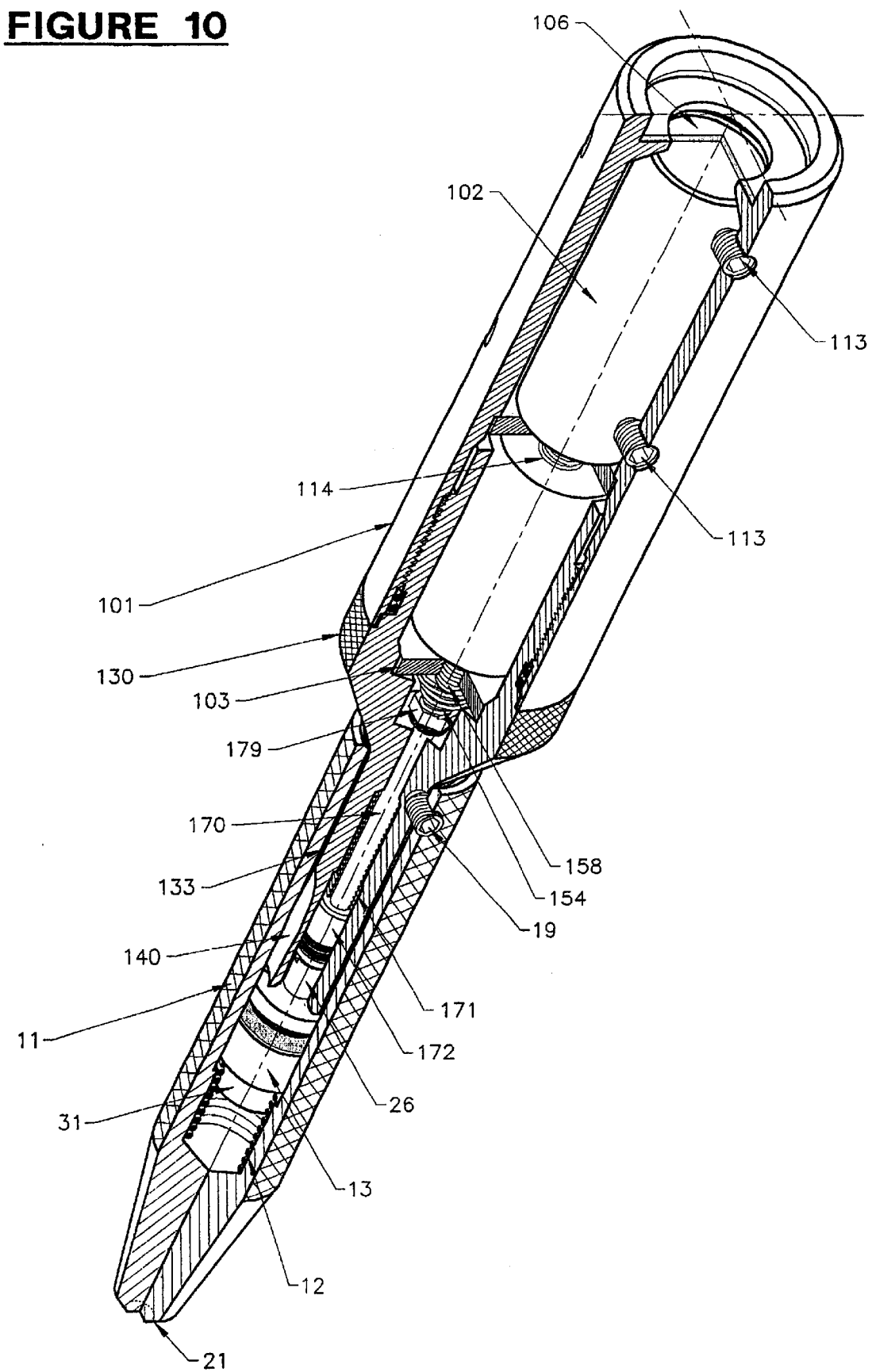
FIG. 10 shows the components shown in FIGS. 1 to 9 in an assembled apparatus.

When assembled, as shown in FIG. 10 the switch actuating assembly 5 is placed within the switch housing assembly 6. In turn, the switch housing assembly 6 is threadedly engaged with the laser housing assembly 4. The switch housing assembly 6 is then able to be attached to the sleeve assembly 2 to thereby operate the alignment means.

The sleeve assembly 2 will now be described in detail with reference to FIG. 1.

The sleeve assembly 2 is comprised of a sleeve member 11, a biasing means 12 and a piston member 13.

Figure 2:
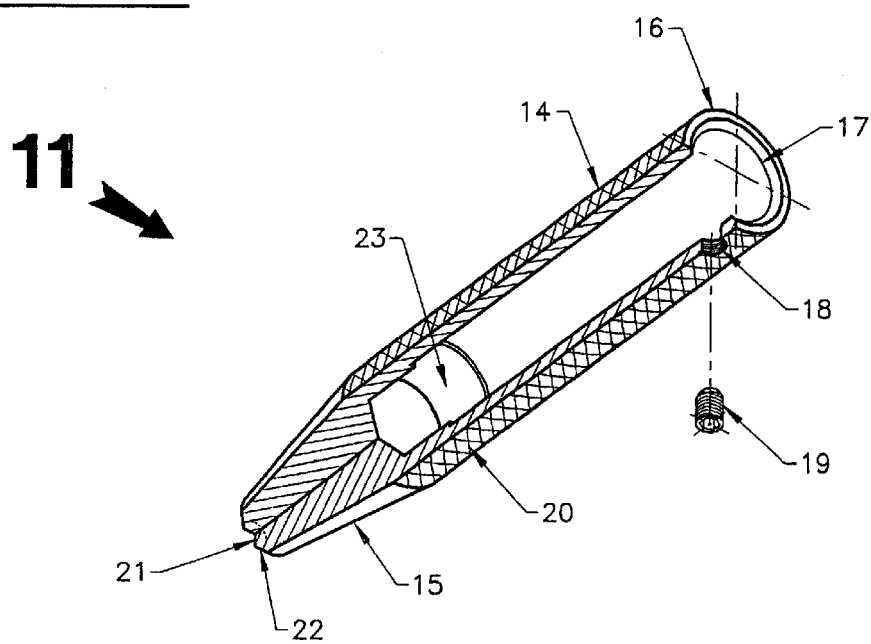
FIG. 2 is a partial sectional perspective view of the sleeve assembly of FIG. 1.

The sleeve member 11 is shown in more detail in FIG. 2. The sleeve member 11 is comprised of a sleeve section 14 formed integrally with a cone-shaped end section 15. At the end of the sleeve section 14 opposite the cone-shaped end section 15, is provided an opening 16. The opening 16 is provided with a bevelled edge 17 to assist in the insertion of the switch housing assembly 6 therein, to be described here below.

The sleeve member 11 may be formed either of a metallic or synthetic material. The sleeve section 14 preferably has a substantially cylindrical shape.

A threaded aperture 18 is preferably provide d proximate the opening 16. A complimentary threaded screw 19 is capable o f being received within the aperture 18. It should be noted that the screw 19 may be replaced by a rivet or a dowel in another preferred embodiment of the present invention. In such circumstances, the aperture 18 does not have to be threaded.

The sleeve section 14 preferably has a drilled and reamed internal surface for the purposes of ensuring it meets accurate tolerances with the cylindrical shaft 133 of the switch housing assembly 6, described below. The external surface of the sleeve section 14 preferably has a knurled surface. The knurled surface of the sleeve section 14 assists in the bonding of the sleeve member 11 with the epoxy resin used in mounting t he sleeve member 11 in accordance with the preferred embodiment of the present method of the invention.

The cone-shaped end section 15 of the sleeve member 11 is preferably formed integrally with the sleeve section 14, but may be provided, according to another preferred embodiment of the present invention (not shown), as a separate member. The cone shaped end section 15 is provided with a blunt end 21 having a chamfer 22. The cone-shaped end section 15 assists in the insertion of the sleeve member 11 into the epoxy resin utilised in the method of the preferred embodiment of the present invention.

The piston member 13, as shown in FIG. 1, preferably has a generally cylindrical shape and adapted to fit within the sleeve section 14. The piston member 13 is preferably comprised of a first cylindrical portion 25 and a second cylindrical portion 26. The first cylindrical portion 25 preferably has a greater diameter than the second cylindrical portion 26. The first cylindrical portion 25 is preferably provided with a groove 27 extending transversely around the circumference of the piston member 13. An O-ring 28 is preferably provided to sit firmly in the groove 27.

The piston member 13 is preferably provided with an axial aperture 29 extending along the axis X of the piston member 13.

The second cylindrical portion 26 is preferably provided at one end thereof with a slot 30. Slot 30 preferably intersects the opening of the aperture 29 thereat.

A spring locating dowel 31 preferably extends from one end of the first cylindrical portion 25 for the purposes of connection to the biasing means 12.

The sleeve assembly 2 is assembled by placing the biasing means 12, comprising a spring, inside the sleeve section 14 of the sleeve member 11.

The piston member 13 is then placed in the sleeve member 11 so that it can slide within sleeve section 14. Once the piston member 13 is inside the sleeve section 14, the screw 19 is screwed into the aperture 18 to retain the piston member 13 within the sleeve section 14 as a result of a shoulder section 32 of the first cylindrical portion 25 abutting against the screw 19 when it extends inside the sleeve section 14.

The piston member 13 is biased against the screw 19 as a result of the biasing means 12 acting in the direction away from the blunt end 21 against the piston member 13.

The piston member 13 may be manufactured from either a metallic or synthetic material.

Once installed as described above, the piston member 13 preferably acts substantially to seal the sleeve section 14 from the outside by way of the O-ring 28 located in the groove 27 of the piston member 13.

The axial aperture 29 and the slot 30 in the piston member 13 preferably act as an air bleed from the inside of the sleeve section 14 when the piston member 13 is pressed into the section 14.

In use, the sleeve assembly 2 is placed in an aperture and fixed in the aperture with a resin material, as will be described below.

A first preferred embodiment of the plug assembly 3 will now be described with reference to FIG. 3.

Figure 3:
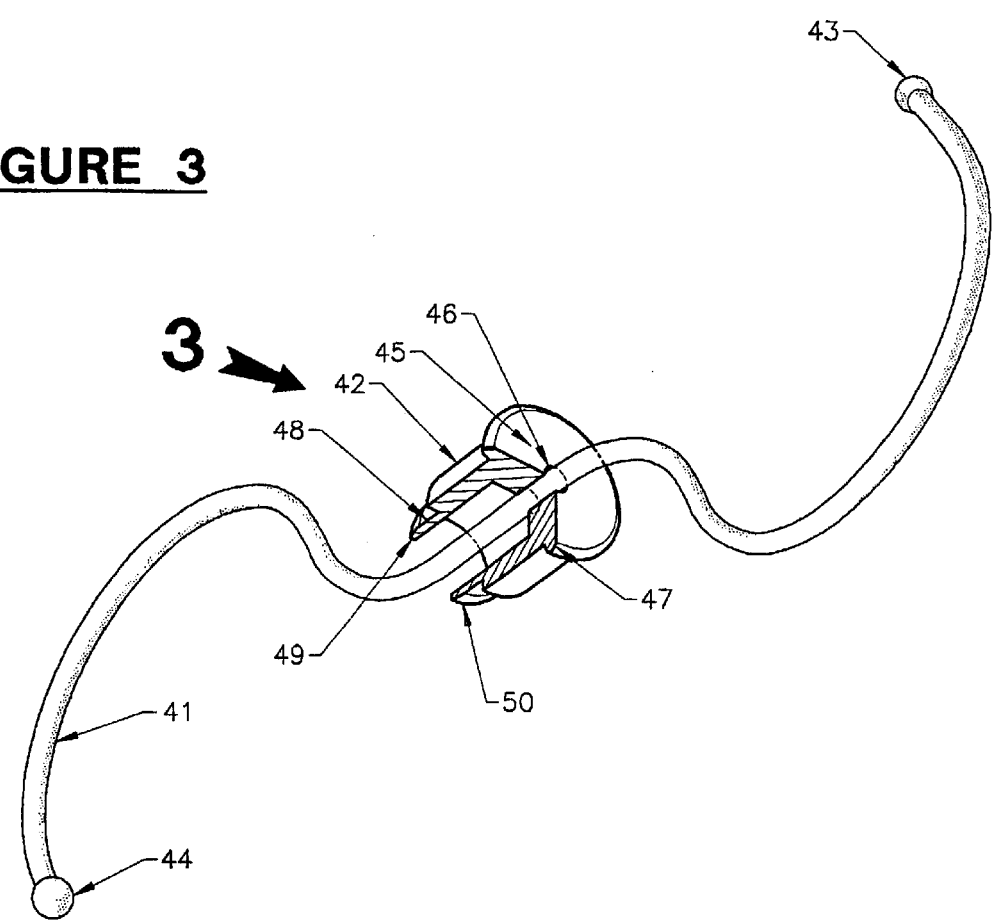
FIG. 3 illustrates a first preferred embodiment of the plug assembly in accordance with the present invention.

The plug assembly 3 in FIG. 3 is comprised of a plug 42 adapted to fit firmly into the opening 16 of the sleeve member 11. The plug 42 is preferably provided with an aperture 46 in the centre thereof through which a string 41 is able to pass. The string 41 is provided with heat sealed ends 43 and 44.

The string 41 is capable of sliding inside the aperture 46 but the ends 43 and 44 prevent the string 41 from sliding completely out of the aperture 46.

The plug 42 is preferably provided with a thumb pressed top 45 for pressing the plug 42 into the opening 16. The top 45 is preferably provided with a non sharp edge 47.

The plug 42 is provided with a seating flange 48 having a radiused rim 49 for easy insertion into the opening 16. The seating flange 48 is preferably provided with over-diameter portion 50 for engaging the plug 42 in the sleeve member 11.

Figure 4:
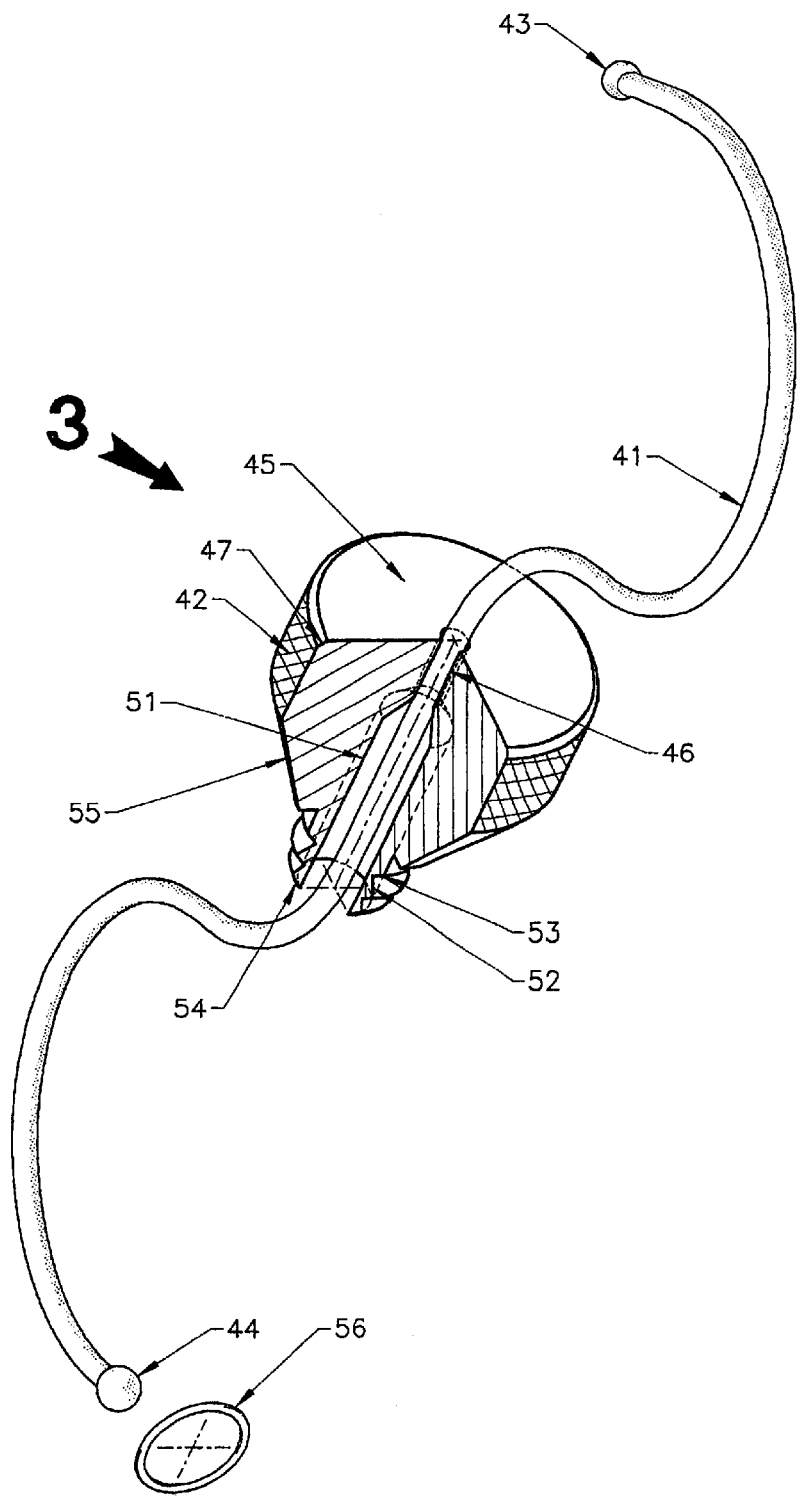
FIG. 4 shows a second preferred embodiment of the plug assembly in accordance with the present invention.

A second preferred embodiment of the plug assembly 3 will now be described by reference to FIG. 4. Like features to that shown in FIG. 3 have been given the same numbering and will not be described again.

The plug 42 of this preferred embodiment is provided with a tapered portion 55 which tapers down to a threaded portion 52. The threaded portion 52 allows the thread to be screwed about the screw 19 of the sleeve member 11. By screwing the plug 52 into the opening 16, the threaded portion 52 engages with the screw 19 to lock the plug 42 into the opening 16.

The aperture 46 of this preferred embodiment also widens to provide a volume 52 in which to receive second cylindrical portion 26 of the piston member 13 of the sleeve assembly 2.

An O-ring 56 may also be provided to be positioned on O-ring seat 53 to assist in sealing the opening 16 when the plug 42 is placed in the opening 16.

Figure 5:
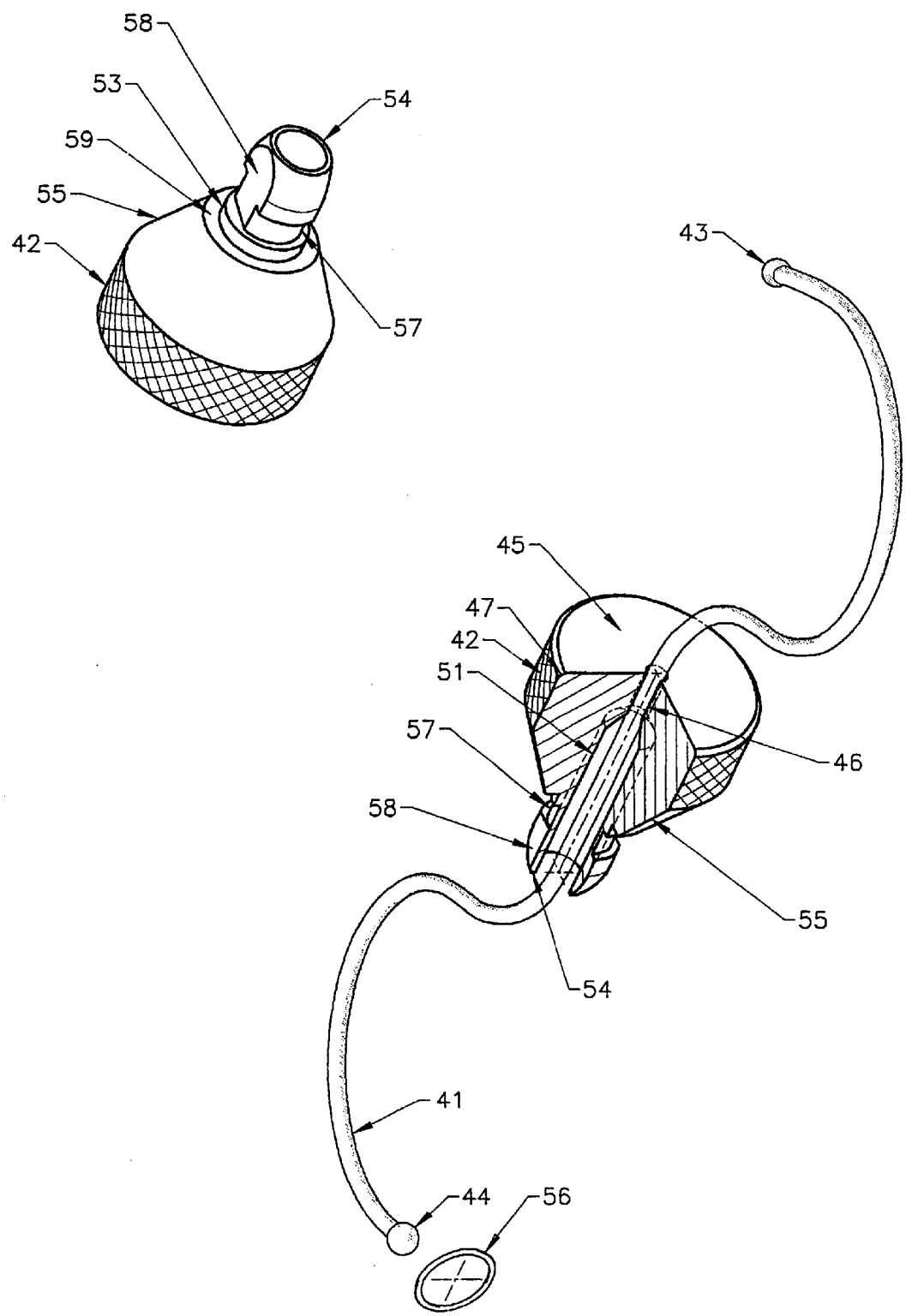
FIG. 5 shows a third preferred embodiment of the plug assembly in accordance with the present invention.

A third preferred embodiment of plug assembly 3 will now be described by reference to FIG. 5. Again, like features have been given the same numbering.

In this preferred embodiment a flat portion 58 is provided on one end of the plug 42 along with a groove 57. Another flat position may be provided on the opposite side. When inserting the plug 42 into the opening 16, the flat portion 58 passes the screw 19 in the sleeve member 11 and can then be rotated to lock into the groove 57.

In use, the end 43 of the string 41 is embedded in the resin material in which the sleeve assembly 2 is placed. Thus, when the plug is taken out of the opening 16, the plug is suspended from the wall by the string 41 so that it is not lost.

A preferred embodiment of the laser housing assembly 4 will now be described with reference to FIG. 6.

The laser housing assembly 4 is preferably comprised of a housing section 101, a laser module 102, a spacer 103, a lens 106 and screws 113.

The housing section 101 preferably has a generally cylindrical shape and has a first end 104 and a second end 105.

The first end 104 is preferably provided with a lens 106 which is received within a recess 107 provided at the first end 104 of the housing section 104.

The first end 104 is provided with a shoulder 108 extending inside the housing section 101 perpendicular to the central axis Y of the housing section 101. The shoulder 108 has an outer surface 109 which is perpendicular to the central axis Y and an inner surface 110 which is sloped relative to the central axis Y.

When assembled, the lens 106 is placed in the recess 107 to abut the outer surface 109 of the shoulder 108 to thereby press fit the lenses 106 in the recess 107.

The first end 104 preferably has a chamfered edge so that the housing section 101 does not have a sharp edge.

The housing section 101 is preferably provided with a cylindrical cavity 111 for receiving the laser means comprising a laser module 102. The cavity 111 preferably has a diameter larger than the diameter of the laser module 102 so that the laser module 102 can move freely inside the cavity 111.

Threaded apertures 112 are preferably provided in the housing section 101 to extend into the cavity 111. The threaded apertures 112 are preferably adapted to receive adjustment means comprising screws 113 in each of the apertures 112. The apertures 112 are preferably arranged around the cavity 111 in a concentric manner.

When the laser module 102 is placed in the cavity 111, the screws 113 are placed in the apertures 112 and the screws 113 are adjusted to abut against the laser module 102 and to hold it in place in the cavity 111. The laser module 102 is thereby restrained from lateral movement within the cavity 111 by the inner surface 110 of the shoulder 109 and the screws 113. The alignment of the laser module 102 can be adjusted by adjusting the screws 113.

The housing section 101 is further preferably provided with an insulator seat section 116 for receiving the insulator 103 with press fit engagement. A bevelled edge 117 is provided adjacent the insulator seat section 116 to assist in the transition of the insulator 103 into the insulator seat section 116.

In use, the insulator 103 is press fitted into the insulator seat section 116. An aperture 115 is preferably provided in the insulator 103 through which a spring 114 is able to pass. The insulator 103 and spring 114 function in part to protect the laser module 102 from impact by the battery to be described hereinafter.

The second end 105 of the housing section 101 is preferably provided at its inner edge with an alignment shoulder 122 for engagement with the switch housing assembly 6, to be described below with reference to FIG. 8.

An O-ring seat section 121 is preferably provided adjacent to the alignment shoulder 122 for receiving O-rings 147 of the switch housing assembly 6, to be described below with reference to FIG. 8.

A threaded section 120 preferably extends from the O-ring section 121. The threaded section 120 is provided for engagement with threaded portion 148 of the switch housing assembly 6, to be described below with reference to FIG. 8.

Adjacent to the bevelled edge 117 is preferably provided an alignment shoulder 118 for engagement with smooth portion 149 of the switch housing assembly 6, to be described below with reference to FIG. 8.

The preferred embodiment of the switch housing assembly 6 of the present invention will now be described with reference to FIGS. 8 and 9.

The switch housing assembly 6 is preferably comprised of a housing body 130 which may be manufactured from a metallic or artificial material. The housing body 130 preferably has a first end 132 and a second end 131. The first end 132 is preferably comprised of a cylindrical shaft 133 and the second end 131 is preferably comprised of a cylindrical portion 134 which has a much larger diameter than the diameter of the cylindrical shaft 133.

The cylindrical shaft 133 is preferably adapted for engagement with the sleeve assembly 2 such that the cylindrical shaft 133 is capable of a snug and aligned fit inside the sleeve section 14 of the sleeve member 11. The first end 132 is preferably provided with a radiused outer surface 135 to assist in the insertion of the cylindrical shaft 133 in the sleeve section 14 of the sleeve assembly 2.

The first end 132 is also preferably provided with chamfered edge 136 for engagement of the cylindrical shaft 133 with the piston member 13 of the sleeve assembly 2.

The cylindrical shaft 133 is preferably provided with an internal bore 137 extending from the first end 132 along the centre axis Z of the switch housing assembly 6. The bore 137 is adapted to receive the elongated rod 170 of the switch actuating assembly 5. The bore 137 preferably has a widened section 138 to accommodate the further 173 of the switch actuating assembly 5 and a second widened section 139 for housing the biasing means 171 of the switch actuating assembly 5.

The cylindrical shaft 133 is further preferably provided with a locking means comprising a longitudinal groove 140 extending along the length of the cylindrical shaft 133. The groove 140, as shown in more detail in FIG. 9, is preferably a bull nosed groove for engagement with the screw 19 of the sleeve assembly 2 when the cylinder shaft 133 of the switch housing assembly 6 is inserted into the sleeve assembly 2. A larger bull nosed groove opening 141 is preferably provided at the start of the groove 140 for easy engagement of the groove 140 with the screw 19. The groove 140 is preferably pitched so that the switch housing assembly 6 rotates as it is inserted into the sleeve assembly 2 to impose the support of the cylindrical shaft 133 of the switch housing assembly 6.

The upper end 142 of the groove 140 preferably forms a transverse groove so that, in use, when the cylindrical shaft 130 of the switch housing assembly 6 is inserted into the sleeve assembly 2, the screw 19 slides along the groove 140 and engages the screw 19 into the upper end 142 of the groove 140 so that the cylindrical shaft 130 of the switch housing assembly 6 is locked in to the sleeve assembly 2. The switch housing assembly 6 can then be disengaged from the sleeve assembly 2 by rotating the switch housing assembly 6 until the screw 19 disengages from the upper end 142 of the groove 140 so that the screw 19 can slide along the groove 140 and disengage from the switch housing 6.

The end of the cylindrical shaft 133 opposite to the end 132 is preferably formed integral with a frusto-conical section 143 which is formed, in turn, integrally with an externally knurled portion 144. The edge of the knurled portion 144 is preferably provided with a raised shoulder 145 to assist alignment with the housing section 101 of the laser housing assembly 4.

The housing body 130 is further preferably provided with a groove 146 for receiving 2 O-rings 147 for sealing and gripping to the laser housing assembly 4.

An externally threaded portion 148 is provided adjacent to the groove 146 and the second end 131 preferably terminates in an externally smooth portion 149 which is adapted to assist in aligning the laser housing assembly 4 with the switch housing assembly 6.

Cylindrical portion 134 preferably forms a battery cavity 150 in which can be received a battery module 151.

The cylindrical portion 134 further defines a switch cavity 153 formed in the frusto-conical section 143.

The switch housing assembly 6 is further provided with an electrical contact 154 preferably comprised of a stainless steel conical spring capable of completing an electric circuit between the battery module 151 and the housing body 130. When assembled, the contact 154 sits in the switch cavity 153 and a nylon insulator and switch seal 156 is press fitted into an insulator portion 155 of the housing body 130.

The insulator 156 is preferably provided with a threaded aperture 157 for receiving a stainless steel adjustable electrical contact screw 158.

The battery module 151 is preferably provided with a positive terminal 159 in a position whereby the contact 154 can make electrical contact with the terminal 159 through screw 158. To thereby complete an electrical circuit between the housing body 130 and the battery module 151.

The switch actuating assembly 5 will now be described by reference to FIG. 7.

The switch actuating assembly 5 is preferably comprised of an elongated rod 170, a bias means 171, a ferrule 172 and O-rings 178 and 182.

The electrical rod 170 is adapted to pass through the bore 137 of the cylindrical shaft 133.

The ferrule 172 is adapted to be located in the widened section 138 of the switch housing assembly 6 described above. The switch actuating assembly 5 may be manufactured from a metallic or synthetic composition.

The ferrule 172 has a cylindrical portion 173 with a chamfered edge 174 at both ends. A partially threaded aperture 175 is provided at the end for engagement with a threaded end 176 of the rod 170.

A groove 177 is preferably provided in the ferrule 172 to receive 2 O-rings 178.

An hexagonal switch retaining flange 179 is provided at the other end of the rod 170 to the threaded end 176. The flange 179 forms a seating point 181 with the rod 170 for the contact 154 of the switch housing assembly 6. The top of the rod 170 provides an electrical contact point 181 for making electric contract with the screw 158 of the switch housing assembly 6.

There is further preferably provided an O-ring 182 for providing additional sealing and spacing from the bore 137.

When assembling, as shown in FIG. 10, the various features described above, the ferrule 172 of the switch actuating assembly 5 is housed in the widened section 138 of the switch housing assembly 6. The rod 170 is provided to extend through the internal bore 137 of the housing body 130 of the switch housing assembly 6. The biasing means 171 of the switch actuating assembly 5 sits in the widened section 139. The O-ring 182 is housed within the switch cavity 153.

As the shaft 133 is inserted into the sleeve member 11 of the sleeve assembly 2, the rod 170 moves inwardly with respect to the shaft 133 causing the seating point 180 to contact the biasing means 154 and the screw 158 of the switch housing assembly 6. This creates an electric circuit connection to the positive terminal 59 of the battery module 151. The current generated flows from the battery module 151 to the laser module 102. In this manner, the laser module 102 is automatically turned on once the switch housing assembly 6, switch actuating assembly 5 and the laser housing assembly 6 are received by the sleeve assembly 2.

When the shaft 133 of the switch housing assembly 6 is withdrawn from the sleeve 11, the spring 171 of the switch actuating assembly 5 biases the rod 170, thus returning it to a position in which the O-ring 182 and flange 179 abuts the shoulder 182 in the bore 137. In this position the switch actuating assembly 5 no longer causes electrical contact with the battery module 151.

According to the method of the preferred embodiment of the present invention, the laser apparatus 1 of the present invention is used by drilling a small aperture (not shown) in a fixed surface where the apparatus 1 is to be located. The aperture is then partially filled with an epoxy resin and the sleeve assembly 2 is inserted into the aperture. Further epoxy resin is to be inserted to completely fill the aperture. The assembly 2 is thus affixed inside the surface by means of the setting epoxy resin.

The plug assembly 3 may also be affixed to the surface by setting the string 41 in the epoxy resin. The plug assembly 3 can then be used to close the sleeve assembly 2 to prevent the entry of dirt.

When the apparatus is to be used, the switch actuating assembly 5 is connected to the switch housing assembly 6 and the switch housing assembly 6 and laser housing assembly 4 are connected to each other.

The plug assembly 3 is then removed from the sleeve assembly 2 and the cylindrical shaft 133 of the switch housing assembly 6 is inserted in the sleeve assembly 2 and locked thereto. As the cylindrical shaft 133 is inserted into the sleeve assembly 2, the second cylindrical portion 26 of the piston member 13 presses against the ferrule 173. This pushes the rod 170 upwards along the bore 137 so that the seating point 180 of the switch actuating assembly 5 moves upwards to press against the contact 154 and the screw 158. This results in making an electrical connection between the screw 158, the positive terminal 159 of the battery module 151, the laser module 102, the screws 113, the housing section 101, the housing body 130, the contact 154 and back to the seating point 180. This causes laser light to be produced out of the lense 106 for setting out purpose.

When the setting out is completed, the laser housing assembly 4, switch actuating assembly 5 and switch housing assembly 6 are removed from the sleeve assembly 2, which removal causes the laser module 102 to be switched off.

The preferred embodiments of the present invention as described above provides various advantages over the known prior art.

For example, by having the apparatus including the laser module and the battery module not housed in the wall, a smaller and easier to drill aperture can be made for receiving the sleeve assembly using a small portable battery drill. Therefore, only a small sleeve assembly needs to be inserted into the wall while the apparatus can be simply attached to the sleeve, but is positioned outside of the sleeve assembly.

By having a means of switching the laser module on when inserting into the sleeve, the preferred embodiment of the present invention improves the battery life and improper use is minimised since the apparatus is not inadvertently left on and cannot accidentally be switched on when out of the sleeve.

Furthermore, by providing the longitudinal and transverse groove in the shaft to attach the alignment means to the sleeve in accordance with the preferred embodiment of the present invention, the apparatus can be quickly installed and removed. By pitching the groove with respect to the centre line, it will prevent the apparatus from rocking along the centreline within the sleeve, that is, opposite ends of the shaft are supported by the pitched groove on the inside of the sleeve.

By providing the plug assembly according to the preferred embodiment of the present invention, it is possible substantially to prevent foreign particles from entering the sleeve, however by using the piston member in accordance with the preferred embodiment, foreign particles built up within the more inaccessible internal areas of the sleeve should be easily ejected.

Furthermore, by using an epoxy resin to encase the sleeve within the wall in accordance with the preferred embodiment, the apparatus can be brought into both horizontal and vertical alignment before the epoxy resin sets and thus retain the intended alignment.

The screw 19 in the sleeve according to the preferred embodiment of the present invention provides several advantages, including retaining the piston member within the sleeve, locking the cylindrical shaft of the alignment means quickly within the sleeve, providing adjustment clearance at manufacture within the sleeve and to hold the plug in position.

The piston member inside the sleeve assembly in accordance with the preferred embodiment of the present invention provides various advantages including ejecting the shaft from the sleeve, preventing dirt from entering the sleeve and ejecting dirt from the sleeve, and activates the laser module when the switch activating means engages with the piston member.

The apparatus of the preferred embodiment of the present invention can replace the equipment of the survey stations of the prior art, thereby removing the various disadvantages of suspended wires, grade lines, grade sticks, etc.

Apart from these improvements, the apparatus according to the preferred embodiment of the present invention also provides major costs savings as a single person can carry out the marking of mine excavation faces, more accurate alignments of the excavation designs can be achieved which in turn reduces the costs associated with misaligned mark-ups.

Costs are also saved as the preferred embodiment removes traditional sighting inaccuracies associated with prior art methods and removes the need for costly floor and wall stripping. Less explosives, time, bogging, machinery costs, labour costs are incurred whilst providing longer sighting ranges. As the switch housing assembly carries its own battery there is no need for external wiring or batteries. The apparatus is such that the mine workers can use the system without the presence of the surveyor, leaving the surveyor to attend to other functions, thereby reducing costs.

Still further, surveyors will not be required to regularly replace eye bolts damaged by blasting or machinery. Mine workers can also continue working without having to estimate alignment on a continual basis.

Modifications and variations such as would be apparent to the skilled addressee are considered to fall within the scope of the present invention.

Throughout the specification, unless the context requires otherwise, the word "comprise", or variations such as "comprises" or "comprising", will be understood to imply the inclusion of a stated integer or group of integers but not the exclusion of any other integer or group of integers.

What is claimed is:

1. A survey apparatus comprising:
    an alignment means for projecting an alignment beam from a laser module; said alignment means comprising a laser housing assembly to house said laser module and a switch housing assembly releasably engageable with said laser housing assembly, said switch housing assembly including a first connection portion and a source of electrical energy; and
    a mounting means for releasably receiving said alignment means, said mounting means including a second connection portion; said second connection portion being complimentary to said first connection portion and completing a disconnectible electrical circuit to provide electrical energy from said source to said laser module;
    wherein said electrical circuit is completed and said alignment beam is projected from said alignment means to conduct a survey when said alignment means is received within said mounting means, and said electrical circuit is broken and said alignment means is incapable of independent operation when said alignment means is removed from said mounting means.

2. A survey apparatus according to claim 1, wherein said laser housing assembly includes adjustment means for adjustably mounting said laser module inside said laser mounting assembly.

3. A survey apparatus according to claim 1, wherein said alignment means further comprises a locking means for releasably engaging with said mounting means to releasably secure said alignment means to said mounting means.

4. A survey apparatus according to claim 1, wherein said mounting means further includes a sleeve member to receive at least part of said alignment means.

5. A survey apparatus according to claim 4, wherein said sleeve member is adapted to be mounted in a surface.

6. A survey apparatus according to claim 1, wherein said mounting means further includes a piston member and a bias means for biasing said piston member in a direction toward said alignment means when said alignment means is received in said mounting means.

7. A method of conducting a survey comprising:

mounting a mounting means within an aperture in a fixed surface, said mounting means being configure to removably receive an alignment means for projecting an alignment beam from a laser module, wherein said alignment means includes a laser housing assembly to house said laser module and a switch housing assembly releasably engageable with said laser housing assembly, said switch housing assembly including a first connection portion and a source of electrical energy, and wherein said mounting means includes a second connection portion, said second connection portion being complimentary to said first connection portion and completing a disconnectible electrical circuit to provide electrical energy from said source to said laser module;

mounting said alignment means within said mounting means such that said electrical circuit between said first and second connection portions is completed and said alignment beam is projected from said alignment means to conduct the survey; and removing said alignment means from said mounting means when said survey is completed to disconnect said electrical circuit and switch off said alignment beam, wherein said alignment means is incapable of independent operation upon being removed from said mounting means.

8. A survey apparatus comprising:

an alignment member including a laser housing assembly and a switch housing assembly releasably engagable with said laser housing assembly, said laser housing assembly including a laser module to project an alignment beam from said alignment member, and said switch housing assembly including an electrical energy source, a movable member and a biasing member to bias said movable member in a direction away from said energy source; and a mounting member to releasably receive at least a portion of said alignment member, said mounting member including a forcing member to force said movable member toward said energy source when said alignment member is received within said mounting member;

wherein said forcing member forces engagement between an electrical contact of said movable member and said energy source to close an electrical circuit between said energy source and said laser module resulting in a projection of said alignment beam from said alignment member when said alignment member is received within said mounting member, and said biasing member forces said electrical contact of said movable member away from said energy source to open said electrical circuit and render said laser module incapable of independent operation when said alignment member is removed from said mounting member.

* * * * *